United States Patent
Leuthold et al.

(10) Patent No.: US 8,934,195 B2
(45) Date of Patent: *Jan. 13, 2015

(54) FLUID DYNAMIC BEARING WITH NON-LINEAR DAMPING

(75) Inventors: Hans Leuthold, Santa Cruz, CA (US); Susan Immisch, Scotts Valley, CA (US); Saul Ceballos, Watsonville, CA (US); Michael Tiller, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,892

(22) Filed: Sep. 14, 2012

(65) Prior Publication Data

US 2013/0071053 A1 Mar. 21, 2013

Related U.S. Application Data

(63) Continuation of application No. 10/436,925, filed on May 12, 2003, now Pat. No. 8,339,731, which is a (Continued)

(51) Int. Cl.

| | |
|---|---|
| *G11B 19/20* | (2006.01) |
| *F16C 17/10* | (2006.01) |
| *F16C 17/26* | (2006.01) |
| *F16C 32/06* | (2006.01) |
| *B23H 3/04* | (2006.01) |

(Continued)

(52) U.S. Cl.
CPC *F16C 32/06* (2013.01); *B23H 3/04* (2013.01); *B23H 9/00* (2013.01); *F16C 17/045* (2013.01); *F16C 17/102* (2013.01); *F16C 17/105* (2013.01); *F16C 17/26* (2013.01); *F16C 33/107* (2013.01); *G11B 19/2018* (2013.01); *G11B 33/00* (2013.01); *F16C 41/008* (2013.01); *F16C 2370/12* (2013.01)
USPC ........... 360/99.08; 310/90; 384/108; 384/110

(58) Field of Classification Search
CPC ........ F16C 17/04; F16C 17/045; F16C 17/10; F16C 17/102; F16C 17/105; F16C 17/107; F16C 17/26; F16C 32/06; F16C 32/0603; F16C 32/0629; G11B 19/20; G11B 19/2018; G11B 19/2036
USPC ......... 360/99.08, 98.07, 99.04; 310/90, 67 R; 384/100, 107, 110, 112, 108
See application file for complete search history.

(56) References Cited

U.S. PATENT DOCUMENTS 3,249,390 A * 5/1966 Schwartzman ................ 384/110
3,476,451 A * 11/1969 Schwartzman ................ 384/110

(Continued)

*Primary Examiner* — Craig A. Renner

(57) ABSTRACT

Thus, if a shock or other disturbance to a disc stack spindle bearing assembly occurs that tilts the bearing assembly, the resulting motion is both a tilting, and a motion which is axial. If a shock axially moves the hub assembly, only an axial motion occurs. Thus the system has a non-linear behavior. Pursuant to this invention, when a tilting disturbance occurs, and some of it is dissipated in a net axial movement at a different frequency, energy is subtracted out of the system with motion that is not linearly related to the disturbance that created it.

23 Claims, 8 Drawing Sheets

Related U.S. Application Data continuation of application No. 10/431,979, filed on May 7, 2003, now Pat. No. 7,193,811.

(60) Provisional application No. 60/383,820, filed on May 28, 2002, provisional application No. 60/378,876, filed on May 7, 2002.

(51) Int. Cl.
*B23H 9/00* (2006.01)
*F16C 17/04* (2006.01)
*F16C 33/10* (2006.01)
*G11B 33/00* (2006.01)
*F16C 41/00* (2006.01)
*G11B 25/04* (2006.01)

(56) References Cited

U.S. PATENT DOCUMENTS

| | | | |
|---|---|---|---|
| 3,749,456 A * | 7/1973 | Whitaker | 384/110 |
| 4,919,547 A * | 4/1990 | Schwartzman | 384/110 |
| 6,210,103 B1 * | 4/2001 | Ramsay | 384/110 |
| 7,193,811 B2 * | 3/2007 | Leuthold et al. | 360/99.08 |
| 2003/0138174 A1 * | 7/2003 | Leuthold et al. | 384/110 |

* cited by examiner

FLUID DYNAMIC BEARING WITH NON-LINEAR DAMPING

CROSS REFERENCE TO A RELATED APPLICATION

This application is a continuation of U.S. patent application Ser. No. 10/436,925, filed May 12, 2003, now U.S. Pat. No. 8,339,731, which is a continuation of U.S. patent application Ser. No. 10/431,979, filed May 7, 2003, now U.S. Pat. No. 7,193,811, which claims the benefit of U.S. Provisional Patent Application No. 60/383,820, filed May 28, 2002, and U.S. Provisional Patent Application No. 60/378,876, filed May 7, 2002.

FIELD OF THE INVENTION

The present invention is directed to the field of disc drives incorporating fluid dynamic bearings, and more particularly to damping undesirable responses to excitation of the drive or bearing system.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings allow support of the spindle or hub about the shaft, and allow for a stable rotational relative movement between the shaft and the spindle or hub while maintaining accurate alignment of the spindle and shaft. The bearings themselves are normally lubricated by highly refined grease or oil.

As a result, the bearing assembly which supports the storage disk is of critical importance. A typical bearing assembly of the prior art comprises ball bearings supported between a pair of bearing spacers which allow a hub of a storage disk to rotate relative to a fixed member. However, ball bearing assemblies have many mechanical problems such as wear, run-out and manufacturing difficulties. Moreover, resistance to operating shock and vibration is poor because of lacking damping.

An alternative bearing design is a fluid dynamic bearing. In a fluid dynamic bearing, lubricating fluid such as air or liquid provides a bearing surface between a fixed member of the housing (e.g., the shaft) and a rotating member which supports the disk hub. Typical lubricants include oil or similar hydrodynamic fluids. Fluid dynamic bearings spread the bearing interface over a large surface area in comparison with a ball bearing assembly, which comprises a series of point interfaces. This is desirable because the increased bearing surface reduces wobble and run-out between the rotating and fixed members. Further, the use of fluid in the interface area imparts damping effects to the bearing which helps to reduce non-repeatable run-out. It is also known that the stiffness to power ratio is a primary way of measuring the efficiency of the spindle bearing assembly. Most known fluid dynamic bearings today in commercial use are made with oil as the fluid which is maintained in the gap between the two relatively rotating surfaces. This maintains the stiffness of the bearing, that is the resistance to shock and vibration; however, because of the relatively high viscosity of such fluids at lower temperatures, such as at startup, considerable power is consumed to establish and maintain high speed rotation.

In these types of bearings, a lubricating fluid, i.e., gas, liquid or air is used in the active bearing region to generate fluid dynamic pressure to prevent metal to metal contact.

The bearing region comprises two relatively rotating surfaces, at least one of which supports or has defined thereon pattern of grooves. The grooves collect fluid in the active bearing region. When the two surfaces of the bearing rotate relative to one another, a pressure profile is created in the gap due to hydrodynamic action. This profile establishes a stabilizing force so that the bearing surfaces rotate freely without contact. In a disc drive, the rotating surface is associated with a hub supporting one or more discs whose rotation and axial location is kept stable by the pressure profile.

The tangential forces created in the bearing area characterize the bearing with respect to changes in shear in the fluid and are summed up in torque, which in turn defines power consumption. The pressure profile defines all forces normal to the bearing surface which characterize the bearing with respect to axial load and radial and angular restoring forces and movement.

A specific fluid dynamic bearing design can be characterized by multiple qualities, including power consumption, damping, stiffness, stiffness ratios and restoring forces and moments.

The design of the fluid dynamic bearing is adapted to enhance the stiffness and damping of the rotating system, which includes one or more discs rotating at very high speed. Stiffness is the changing force element per changing distance or gap; damping is the change force element per changing rate of distance or gap. Optimizing these measures reduces non-repeatable run out (NRRO), an important measure of disc drive performance.

A further critical issue is the need to maintain the stiffness of the hydrodynamic bearing. The stiffer the bearing, the higher the natural frequencies in the radial and axial direction, so that the more stable is the track of the disc being rotated by a spindle on which reading and writing must occur. Thus the stiffness of the bearing in the absence of any mechanical contact between its relatively rotating parts becomes critical in the design of the bearing so that the rotating load can be stably and accurately supported on the spindle without wobble or tilt. Typically two dynamic bearings are provided spaced apart along the shaft. The problem becomes to damp out the discs response to radial excitation which otherwise creates non-repeatable run out.

SUMMARY OF THE INVENTION

In a linear system the spectral content of action and reaction are identical, i.e. a motion at one frequency will result in a force at the same frequency and vice-versa. The elastic assembly consisting of a spindle with its bearings and its inertial load (from here on called discstack-spindle-bearing assembly) is traditionally considered to be a linear system in spite of the fact that stiffness and damping of an FDB are non-linear with respect to the change in bearing gap subject to motion. The principle of this invention is to define ways to make use of the non-linearity in the bearing system to create a reaction richer in spectral content and in more degrees of freedom than the action which is the source of the disturbance of the spindle and bearing assembly. This principle allows us to spread the dissipation of the disturbing energy over a wider bandwidth and into axes of movements that do not diminish the recording accuracy of the disc drive.

The following illustrates this principle.

In a disc drive, a hub disk stack assembly is provided which is supported by an upper and a lower bearing. Together they exert a sum of thrust forces that keep the bearing flying at a stable height and with a stable axis of rotation. The appropriate choices of individual lubricants and bearing size with or without the application of an axial bias force defines the upper bearing as a small gap high stiffness bearing and the lower bearing as a large gap small stiffness bearing. The choice of "upper" and "lower" is arbitrary at this point and is meant to facilitate the illustration.

The local pressure in either bearing is proportional to the inverse of the square of its respective gap. The integral (sum) of the pressure over the axial projection of the bearing surface is equal to the thrust force exerted by either bearing on the opposing rotor surface. This is a non-linear relationship that is amplified by the very different choices in bearing size, lubricant viscosity and gap size for the upper and lower bearings.

If one tilts this bearing, the resulting relative gap change is much larger in the upper bearing than in the lower one. Due to the non-linear relationship, the resulting thrust force balance is only reached if the hub is displaced downwards. This defines the cross coupling between tilt and axial movement.

The axial movement is independent of the sign of the initial tilt on the hub. This means that a clock wise tilt results in the same axial displacement of the rotating hub as a counter clock wise tilt of the same magnitude. Hence, the rotor flies "highest" without any tilt and "lowest" if a maximum (sign less) tilt is applied. This means that a sinusoidal tilting movement will result in an approximately sinusoidal axial movement at the double frequency. This defines the non-linear nature of the cross coupling.

The resulting axial movement will be mechanically dampened by the axial damping characteristics of both bearings. What this means is that a portion of the energy that excites the rotating hub is dissipated is at a frequency other than the frequency of the exciting force and this in a purely axial direction.

Thus, if a shock or other disturbance to the system occurs that tilts the bearing assembly, the resulting motion is both a tilting, and a motion which is axial. If a shock axially moves the hub assembly, only an axial motion occurs. This also demonstrates that the system has a non-linear behavior. Pursuant to this invention, when a tilting disturbance occurs, and some of it is dissipated in a net axial movement at a different frequency, energy is subtracted out of the system with motion that is not linearly related to the disturbance that created it.

In one preferred example, the shaft includes upper and lower conical bearings having effective surfaces and gaps of different sizes. Further, the larger bearing surface with narrower gap, will use air or gas. Alternatively, the cones may be replaced with combinations of thrust and journal bearings or even spherical bearings, provided the difference in dynamic stiffness, or sensitivity of bearing load to gap change is preserved.

Further, the axial motion may be dissipated in groove less bearings to the extent that they provide mechanical damping to the axial bearing assembly. Also, rather than provide two bearings, an axial bearing may include the lift generated between a rotating disk and surface supported from the sleeve. Implementations are possible with stationary shafts and rotating shafts.

In a further alternative, the axial load provided by the mechanical bearings can be biased by an external force, for example using a permanent magnet. In this case the axial thrust of the fluid dynamic bearing is balanced by the external force, providing for a stable flying height in absence of perturbing vibration. Radial or angular perturbing vibration will result in an axial flying height change such as the one described in the previous paragraph with the same effect as claimed.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
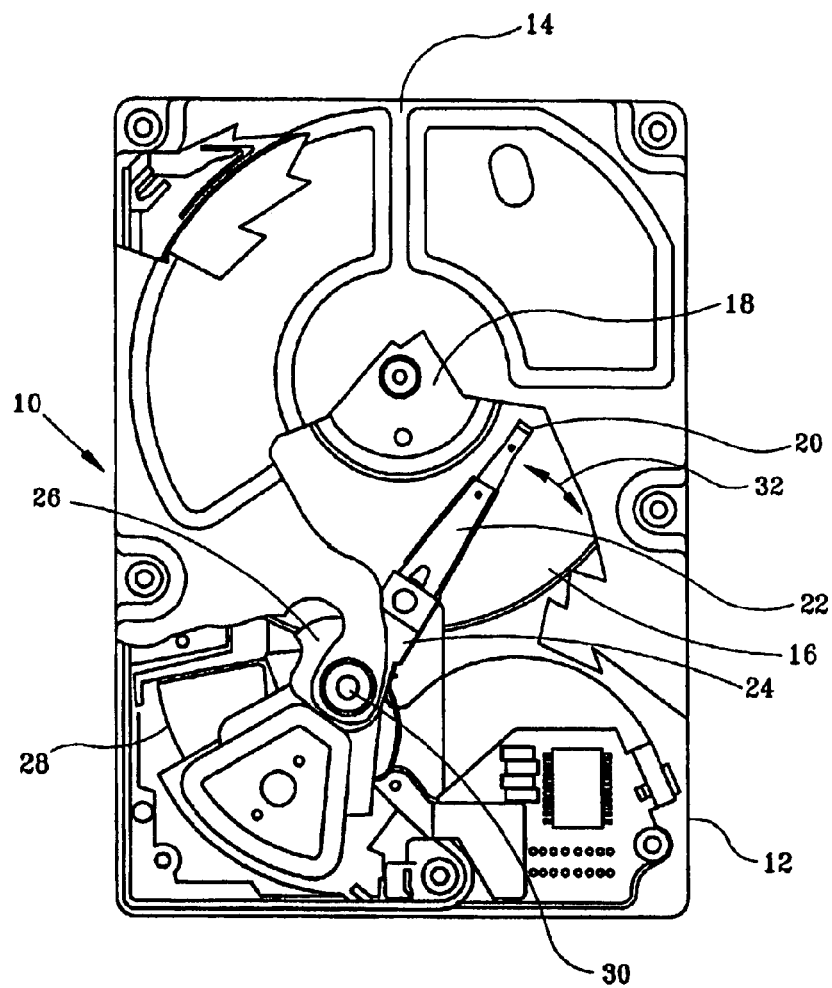
FIG. 1 is a plan view of a disc drive in which motors incorporating the present invention are useful.

FIG. 1 depicts a plan view of an embodiment of a typical disc drive in which embodiments of the present invention, because of its stability and long life are especially useful. Referring to FIG. 1, the disc drive 10 includes a housing base 12 and a top cover 14. The housing base 12 is combined with cover 14 to form a sealed environment to protect the internal components from contamination by elements outside the sealed environment. The base and top cover arrangement shown in FIG. 1 is well known in the industry. However, other arrangements of the housing components have been frequently used and there is no particular limitation to the configuration of the housing.

The disc drive further includes a disk pack comprising one or more disks mounted for rotation on a spindle motor not shown by disc clamp 18. The disc pack 16 of one or more discs provides disks mounted for rotation about a central axis. Each disc surface has an associated read/write head 20 which is mounted to disc drive 10 for communicating with the disc surface. In the example shown in FIG. 1, read/write heads 20 are supported by flexures 22 which are in turn attached to head mounting arms 24 of an actuator body 26. The actuator shown in FIG. 1 is of the type known as a rotary moving coil actuator and includes a voice coil motor shown generally at 28. The voice coil motor rotates the actuator body 26 with its attached read/write heads 20 about a pivot shaft 30 to position read/write heads 20 over a desired data track along a path 32. While the rotary actuator is shown in FIG. 1, the invention may be used with other disc drives having other type of actuators such as linear actuators; in fact, the specific disc drive shown herein is intended only to be exemplary, not to be limiting in any sense.

Figure 2:
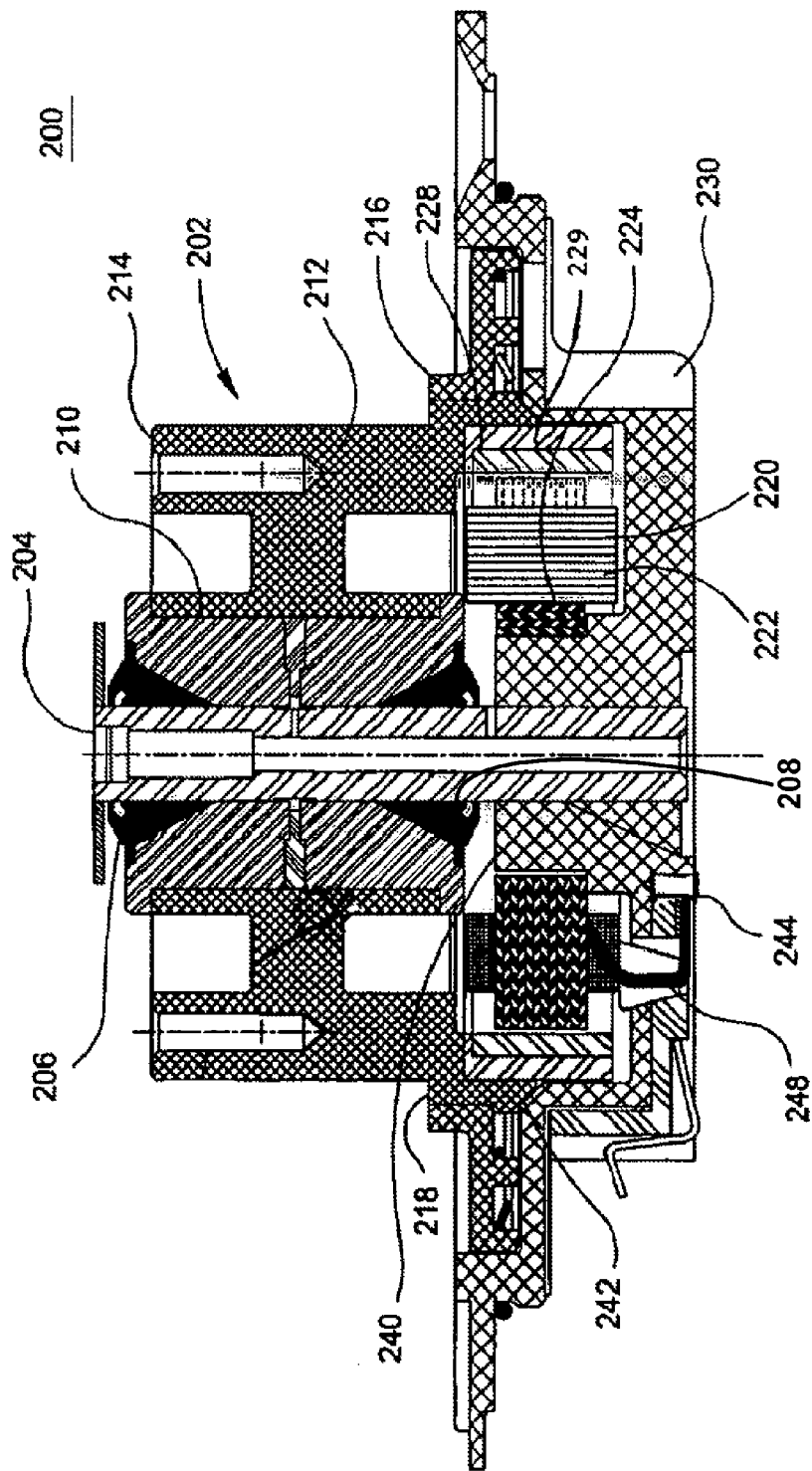
FIG. 2 is a vertical sectional view of a prior art spindle motor.

FIG. 2 is a vertical sectional view of a known spindle motor including a set of conical hydrodynamic bearings 206, 208 which support relative rotation between the shaft 204 and hub 202. The motor is a brushless direct current motor 200 comprising a hub 202 rotatably mounted about the stationary shaft 204 by the upper and lower bearings 206 and 208 respectively. The hub 202 which supports one or more discs such as as shown in FIG. 1 for rotation is formed in a generally inverted U shape as seen in cross section, and has an inner annulus sleeve 210 and an outer cylindrical surface 212 and a top portion 214. Outer cylindrical surface 212 includes a shoulder 216 for supporting one or more discs in the contaminant free environment which encloses the motor and discs. A plurality of storage discs separated by spacers or washers could easily well be stacked along the vertical length of outer cylindrical surface 212. The inner portion of hub 202 operably receives a stator, generally designed 220, including a stator lamination stack 224 and stator windings 222. A permanent magnet 228 is mounted on a back iron 229 supported from outer annular arm 218 for magnetically interacting with magnetic reactor stator laminations stack 224 and stator windings 222. It is to be understood that a plurality of permanent magnets may make up the magnet 228 in this design.

Stator support 240 surround stationary shaft 204 and supports stator 220 in a substantially vertical position. Stator support 240 comprises a boss 242 formed in base plate member 230 which serves to maintain disc drive motor 200 in a spaced relation with respect to base member 230. The stator 220 is bonded to the base 230.

A circuit connector 244 is mounted to a lower surface of the base member 230. The circuit connector 244 is electronically connected to stator windings 222 by a wire 248 for electrical communication between the stator windings and a printed circuit board (not shown). By energization of this circuitry, we create torque to run at right speed, control signals cause constant speed rotation of the hub about the shaft 204 as supported by the upper and lower conical bearings 206, 208.

Considering the known fluid dynamic bearings such as shown in FIG. 2, the efficiency of the spindle bearing assembly may be expressed in the form of a stiffness to power ratio with stiffness being the ability to withstand shock, and power being power consumed to establish and maintain relative rotation between the two sides of the bearing as supported by the fluid in the gap between those two sides. Typically, in designing a motor using fluid dynamic bearings, the specification is established for stiffness and for power; the objective then becomes to achieve both of the specifications, and to optimize this ratio of stiffness to power. In this invention, the upper bearing has a small gap, a large surface and a smaller viscosity fluid (as an example) and the lower fluid dynamic bearing has a large gap, a small surface area and a larger viscosity fluid (typically liquid) therein (as an example). The result is a bearing system that provides for a stable axial equilibrium position of the rotating body characterized by largely equal thrust forces on both opposing bearing surfaces apart from gravity, but at the same time very different sensitivities of these thrust forces to changes in their respective bearing gaps, which in turn characterize the two opposing bearings by very different stiffness and damping characteristics which result in the nonlinear behavior of the assembly. One example of use of different fluids would be to use air or gas in one gap, and a liquid in the other.

It is also known that the viscosity of air is about $\frac{1}{256}$ of a typical oil at 70° C. which is considered to be a typical approximate upper limit for a fluid bearing specification although fluid bearings may operate at much higher temperatures; it is further known that the viscosity of air is independent of temperature. This eliminates the dilemma of having to make tradeoffs of low temperature power (which is where most power is consumed in a fluid bearing) versus high temperature stiffness (which is where, due to the decrease in viscosity, stiffness is typically lost in a bearing utilizing liquid fluid in the gap), making an air (or gas) fdb desirable.

In determining the dynamic characteristics of a discstack-spindle-bearing assembly, a first observation that is typical in some measure to all such assemblies is that the radial and axial responses to a fixed frequency radial excitation shows the expected peaks at the excitation frequency as well as the excitation frequency modulated by run-out. At least part of the response is due to the fact that run-out is a rotating excitation force, causing some of the frequency peaks to "fold" about the once per revolution frequency.

The second observation is that the axial response to a fixed frequency radial excitation shows as well peaks at multiples of the excitation frequency modulated by run-out. The fact that the spectrum of the axial response, that is, movement in the axial direction of the sleeve or shaft contains more than the expected frequency peaks indicates that the transfer function includes multiples of the excitation with itself which in turn is the definition of a non-linear behavior. This non-linear relationship means that the usual analysis of motion which assumes that if for an applied tilting force an axial movement is created; then for an equivalent axial force a tilting movement is created, does not apply. The inventors herein have observed a non-linear energy transfer, thus, by damping the movement in the axial direction in such a bearing system, the non-repetitive run-out which created the axial movement can be damped thereby damping the tilting movement without further substantial negative effects in the operation of the system. The damping will produce heat, which is to some extent undesirable, but is not nearly as difficult to deal with as is the effects of non-repetitive run-out in a disc drive.

Figure 3A:
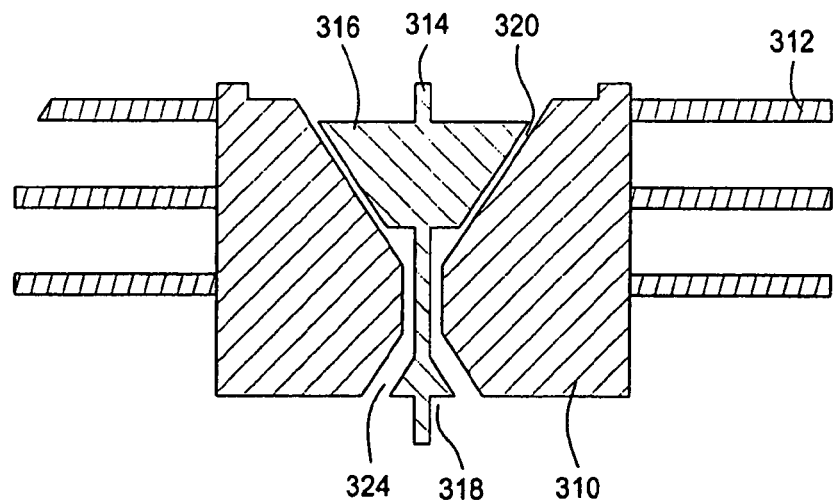
FIGS. 3A, 3B, 4, 5A, 5B, 6, and 7 are schematic diagrams of alternative embodiments of the present invention.
Figure 3B:
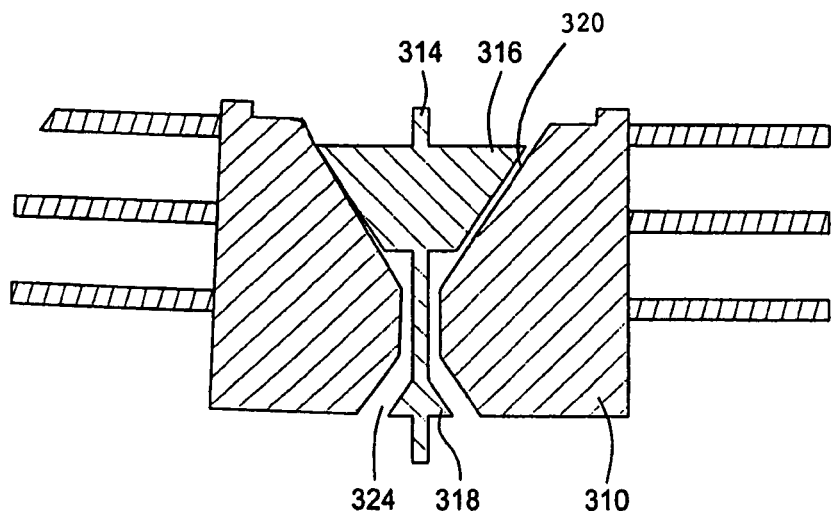

Thus, if when a drive is shaken or otherwise disturbed while operating, and the linear axial movement can be damped so that there is little or no linear displacement, then there will be a damping of the tilting or non-repeatable run-out movement by virtue of this same damping. The present invention can be better understood by reference to certain embodiments beginning for example with that shown in FIGS. 3A and 3B. Referring thus to FIGS. 3A and 3B, a sleeve 310 supports one or more discs 312, and is in turn supported for rotation by a fixed shaft 314. The shaft 314 includes a relatively large cone 316 at or near one end thereof and a relatively smaller cone 318 near the other end thereof. The sleeve 310 is supported for rotation about the sleeve and cone combination by fluid or air in a gap 320 between cone 316 and sleeve 310 which is a small gap, and a relatively larger gap 324 between cone 318 and sleeve 310. Thus this FIG. 3A shows a hub discstack assembly 310, 312 which is supported axially by upper and lower bearings 316, 318. Together they exert a sum of thrust forces that keep the bearing flying at a stable height. The appropriate choices of individual lubricants and bearing size with or without the application of an axially bias force defines the upper bearing as a small gap high stiffness bearing and the lower bearing as a large gap small stiffness bearing.

The local pressure in either bearing is proportional to the inverse of the square of the respective gap. The integral (sum) of the pressure over the axial projection of bearing surface is equal to the thrust force exerted by either bearing on the opposing rotor surface. This is a non-linear relationship.

If one tilts this bearing system as shown in FIG. 3B, the resulting gap change is much larger in the upper gap 320 of the upper bearing 316 than in the lower gap 324 of the lower bearing 318. Due to this non-linear relationship, the resulting thrust force balance is achieved if the hub 310 is displaced downwards. This thereby defines the cross coupling between the tilt shown in FIG. 3B and the axial movement of the hub. The axial movement which is demonstrated here is independent of the sign of the initial tilt on the hub. This means that tilt induced axial movement along the axis which is defined by the center axis of the shaft 314 is independent of the sign of the initial tilt on the hub. This means that a clockwise tilt results in the same axial displacement of the rotating hub as a counter-clockwise tilt of the same magnitude. Hence, the rotor flies highest without any tilt and lowest if a maximum (signless) tilt is applied. This means that a sinusoidal tilting movement will result in an approximately sinusoidal axial movement at the double frequency. This defines the non-linear nature of the cross coupling.

A pure radial disturbance to the bearing system shown in FIG. 3B will have a similar effect since to and fro radial movements will result in the same axial movement.

The resulting axial movement will be mechanically damped by the axially damping characteristics of both bearings, including the fluid incorporated in the gaps 320, 324, the size of the bearing surfaces which are the surfaces of the cone and the facing surface of the sleeve, and the size of the gap. This also means that a portion of the frequency that excites the rotating hub is dissipated at a frequency other than the frequency the exciting force and in a purely axially direction.

It has been concluded by the inventors herein that the use of selected bearing geometries can allow the dissipation of energy at frequencies other than that of the exciting force or moment, provided that the condition is established that a tilt or radial movement of the rotor results in a net-axial force that axially moves the rotating hub independent of the sign of the initial tilt or radial movement, so that the further axial movement of the hub is quickly damped or dissipated and the hub, with the disc attached thereto that has been subjected to a force is quickly brought to rest without further axial dislocations. In sum, when the hub 310 is tilted as shown in FIG. 3B, a net axial movement will result. It can also be seen that the hub 310 sits highest relative to the shaft 314 when it is straight; and its sits lowest when it is tilted either to the left or to the right. For example, if the hub 310 is tilted right left right left at about a certain frequency, then the axial movement will be at double the frequency. Since the impetus is proportional to frequency, you get double the force in terms of the effectiveness of the damping which is applied to the axial movement. Thus the objective is to apply the damping in the axial direction, which will result in a damping of the tilting movement of the hub relative to the shaft. But it is noted that the damping will not be effective if the surfaces of the two conical bearings are equal, because the changes in the gap across each surface pair or fluid bearing would be equal and little additional damping would occur. Therefore, a mismatch between the bearing gaps, the effective surface areas of the two conical bearings or the effective surface areas of two fluid bearings at opposite or near opposite ends of the shaft is necessary to create the desired damping effect.

Figure 4:
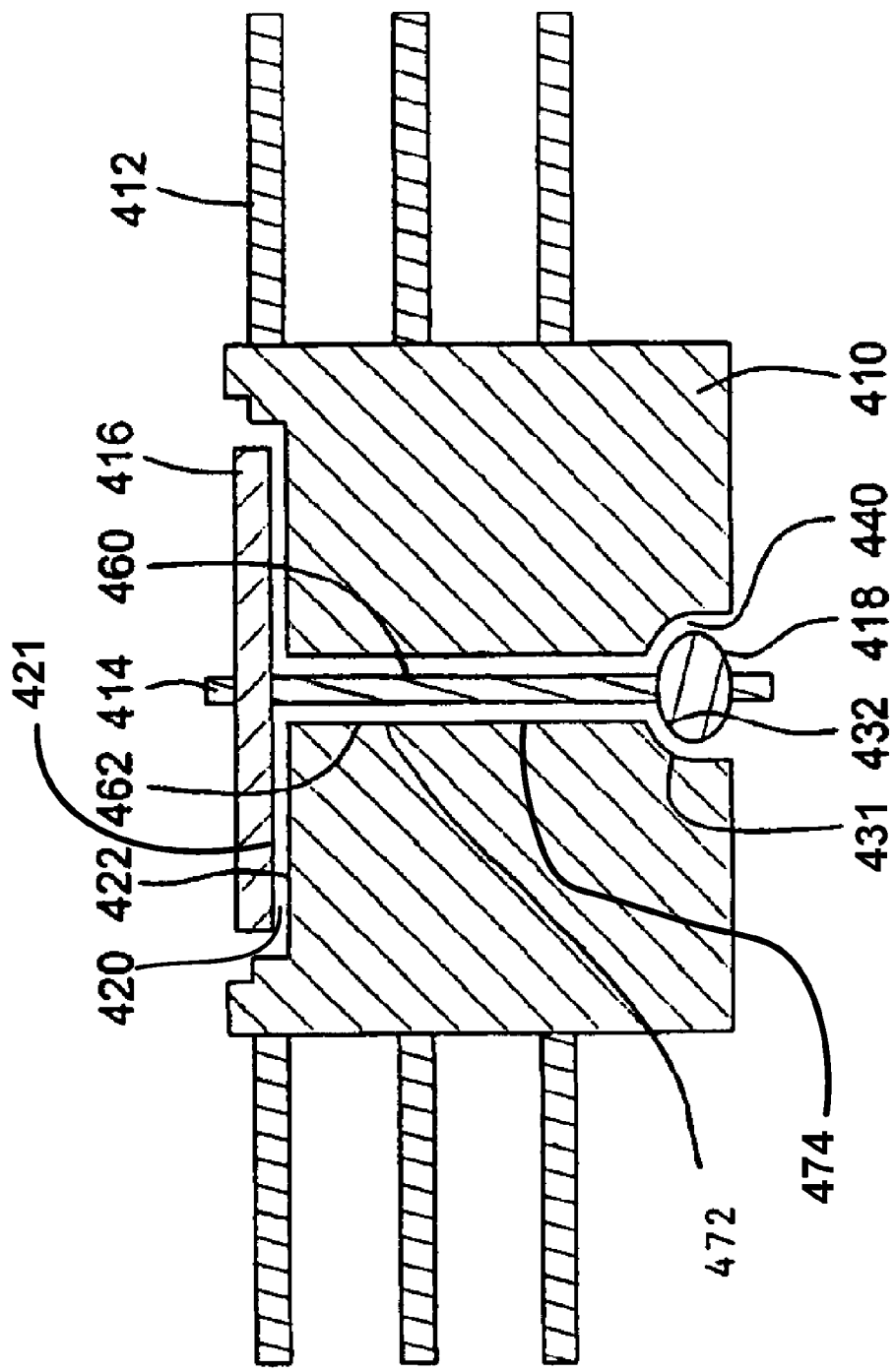

Referring next to FIG. 4, we see a hub 410 supporting discs 412 for rotation relative to a shaft 414. The support for the relative rotation is provided by a thrust bearing 416 which is substantially greater in radial dimension than the generally spherical bearing 418. It can be seen that the thrust bearing 416 is of a substantially greater radial extent in its thrust plate 416 which cooperates with the facing surface 422 of sleeve 410 than the spherical bearing 418 which is also of known construction and cooperates with the facing surface 431 of the sleeve 410.

It has also been found to be more effective if the bearing with the larger surface area is lubricated in the gap between the plate cone or sphere and the facing surface with a gas; the small cone, thrust plate or sphere as shown in FIGS. 3 and 4 may be lubricated with liquid in the gap. In FIG. 4, the gap 420 in the larger thrust bearing would be filled with gas, air, or another low viscosity fluid, and the radially circular or conical bearing gap 440 would be filled with fluid and would thereby establish a hybrid bearing with substantial damping.

It should be noted that the axial motion which is necessary to be dissipated may be damped out using grooveless bearings such as the conical bearing of 318 of FIG. 3B and the generally curved bearing 418 of FIG. 4.

Figure 5A:
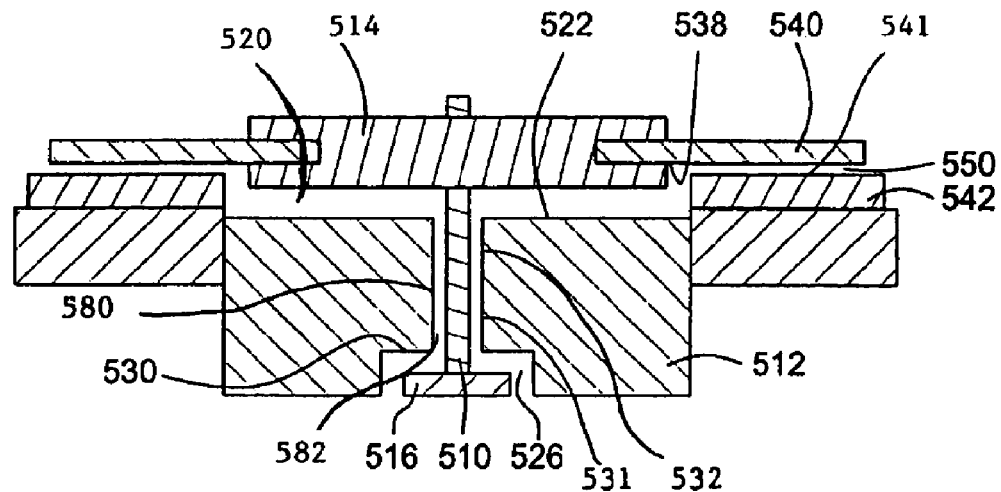
Figure 5B:
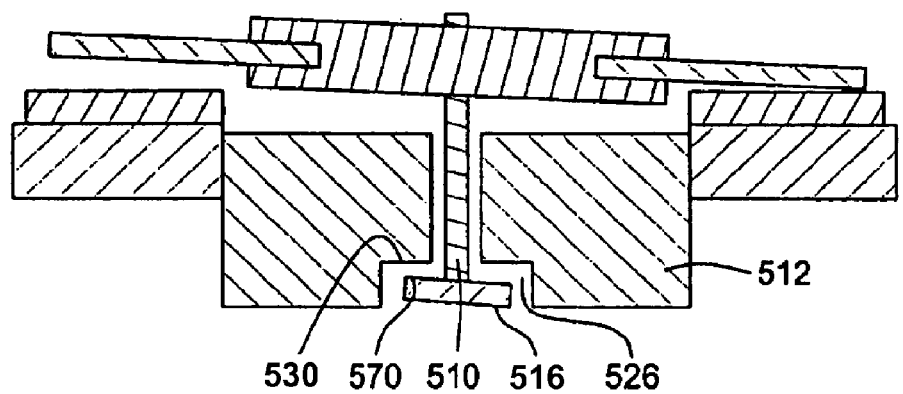

FIGS. 5A & 5B is an alternative embodiment in which a rotating shaft 510 rotates within a sleeve 512. A radially enlarged thrust plate 514 is supported at or near one end of the shaft, and a smaller thrust plate 516 is supported at or near the other end of the shaft. A gap 520 separates the thrust plate 514 from the facing surface 522 of the sleeve 512 and a gap 526 supports the smaller thrust plate 516 from the facing surface 530 of sleeve 512.

The larger radial thrust plate supports one or more discs 540 across from the sleeve or similar fixed element 542. In this embodiment, the stability or damping of the rotation is established in part in addition to the relative damping between the large thrust plate 514 and the smaller thrust plate 516. Pressure is established between a surface 538 of the disc 540 and the facing surface 541 of the housing extension 542 supported from the sleeve 512. In this way, even when tilting occurs between the shaft 510 and the sleeve 512, damping against further displacement occurs. This approach is based in part here as in the other embodiments on the fact that the lift in the gap is a function of one over the gap squared. Thus as the gap becomes smaller, the potential for establishing lift a stabilizing lift force becomes greater. It also can be seen by inspection of FIGS. 5A and 5B that as the disc 540 tilts down shrinking the gap on the right side the same disc enlarges the gap 550 on the left side. Thus there is still a net force to achieve the damping effect whether the tilt is to the left or to the right which means that the design tends towards stability in either event. This explanation of the damping of forces applies to both FIG. 5 and the embodiment of FIG. 4. The embodiment of FIG. 4 includes the further feature of incorporating what is a generally spherical or elliptical outer surface 432 to prevent any misalignment between that surface and the facing surface 431 on the opposite side of the gap 440 when the tilting movement occurs along with the axial movement of the shaft 414. Thus, FIG. 4 incorporates both the axial damping provided by the spherical, elliptical or generally conical surface interacting with the gap 440 and the facing surface; as well as incorporating a journal bearing 460 of a known design along the axial length of the shaft 414 and the facing surface 462 of the sleeve and finally, a thrust plate 416 as described above. Therefore, a mismatch between the effective surface areas of the two conical bearings or the effective surface areas of two fluid bearings at opposite or near opposite ends of the shaft is necessary to create the desired damping effect. The effect appears because the damping occurs in a non-linear sense because of the relationship established by the formula of one over the gap squared.

Thus, referring to FIGS. 5A and 5B, the net axial force which is to be damped can also be damped by lower level thrust plate 516, utilizing the fluid which is in the gap 526 between the upper surface 570 of the lower thrust plate and the facing surface 530 of the sleeve 512. In all cases of FIGS. 3, 4 and 5, the surfaces facing the gap could be either grooved or ungrooved and they are effective in either instance. If the surfaces are ungrooved, typically a journal bearing such as bearing 460 of FIG. 4 is provided for radial support.

Figure 6:
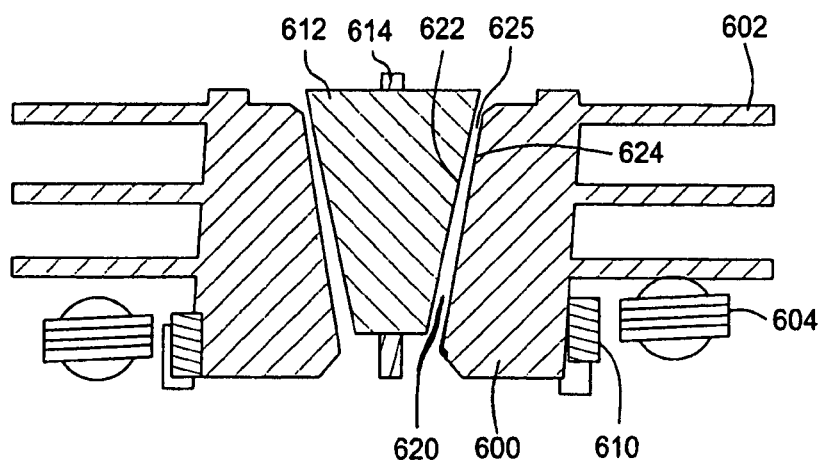

FIG. 6 is a further alternative embodiment including hub 600 supporting discs 602 for rotation under the influence of motor represented by stator 604. (The embodiments of FIGS. 3A, 3B, 4, 5A & 5B all can be incorporated in motors in similar fashion). The hub supports a magnet 610 which is typically the magnet that interacts with the stator 604 to cause rotation. The hub is preloaded against a single cone 612 mounted for rotation about an axis of a shaft 614. Rotation of the sleeve relative to the shaft is supported by gas or liquid in the gap 625 between surfaces 622, 624; at least one of these surfaces is grooved to pressurize the gas or liquid (fluid) in gap 625. (The magnet 610 could also interact with a stationary steel ring to create an axial force.) Once again, the hub is tilted as shown, then the gap 620 between the faces 622 of the cone and 624 of the hub changes, and a net axial force is created. The additional axial damping now is created by the double frequency axial movement of the hub relative to the cone, whether the gap 620 is filled by gas or a fluid. Thus the axial load provided by dynamic bearing systems can be biased by an external force for example using the permanent magnet 610. In this case, the axial thrust of the fluid dynamic bearing is balanced by the external force providing for a stable flying height in absence of perturbing vibration. Radial or angular perturbing vibration will result in an axial flying height change such as been described with respect to FIGS. 5A and 5B with the same effect of damping out the tilting by changes in the axial force.

Figure 8A:
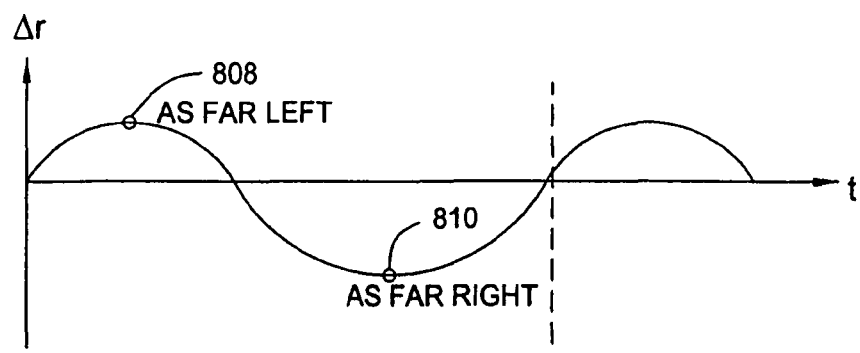
FIGS. 8A & 8B are useful in illustrating the non-linear behavior of a disc stack spindle bearing assembly.
Figure 8B:
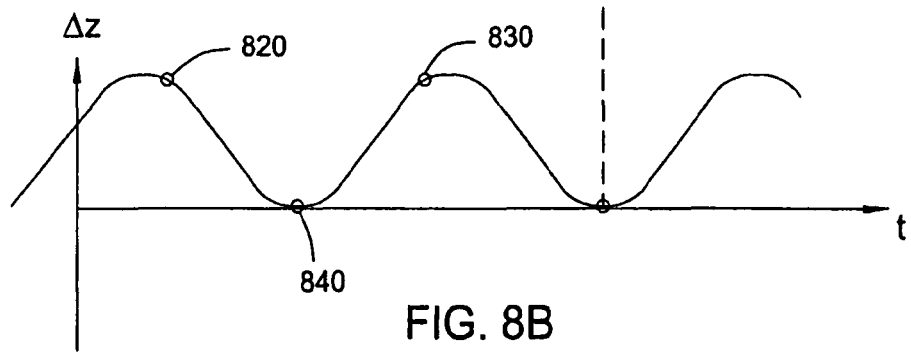

The use of bearing geometry as described herein allows dissipation of energy at frequencies other than the one of the exciting force or moment. The tilt or radial moment results in an axial force axially moving the rotating hub independent of the side of the initial tilt radial movement. A tilt because of shock, vibration of the like causes a tilt in the disc; the invention damps this tilt by damping axial movement. If tilt is represented as the sign where every bottom is the farthest extent to the left the disc can go and every top is the farthest extent to the right that the disc can go, that would mean that only where it goes to zero does the disc have a minimal amount of motion. So as shown as in FIG. 8A, which is radial displacement versus time, radial movement, delta r, the point 808 is the disc being as far left as possible, the point 810 being as far right as possible. Then consider a delta z axis. When the disc is as far left as possible, it is going to be at its highest, (FIG. 8B, 820) and again as far right as possible it is at its highest point 830; the low point 840 is midway between when the disc is planar. It is apparent the frequency doubles, comparing FIGS. 8A & 8B. This demonstrates the non-linear link.

Thus, by adopting these or alternative embodiments of the invention, it is possible to dissipate energy at frequencies other than the one of the exciting force or moment, the condition being that a tilt or radial movement of the rotor results in a net axial force that axially moves the rotating hub independent of the sign of the initial tilt or radial movement to prevent or diminish the tilting of the system.

EXAMPLE 1

Referred to FIGS. 5A and 5B, preferably the top surface 570 of thrust plate 516 would be grooved to establish a thrust plate. Also a journal bearing 580 would be defined in the gap 582 between the shaft 510 and the sleeve 512 typically comprising 2 grooved regions 531, 532 which can be defined on either surface. Finally, the surface 538 of the disc 540 is close enough to the facing surface 541 of sleeve 512 to establish the other critical gap 550 which works with bearing 516 to accomplish the damping. Note that neither of the surfaces 538, 541 facing gap 550 needs to be grooved to support the rotating system. Preferably in this design the gap 550 is air, and the gap 526 is liquid filled.

EXAMPLE 2

Referring to FIG. 4, preferably 3 bearing surfaces could be established by providing grooves on a surface 421 of thrust plate 416 to establish a thrust bearing in gap 420; and further providing journal bearings comprising grooved regions 472, 474 on the surface of the shaft 414 or sleeve 410. The surface 432 of sphere 418 (and the facing surface of sleeve 410) are left ungrooved. Alternatively, grease is placed in the gap 440 (which is thick enough to stay in place).

EXAMPLE 3

Figure 7:
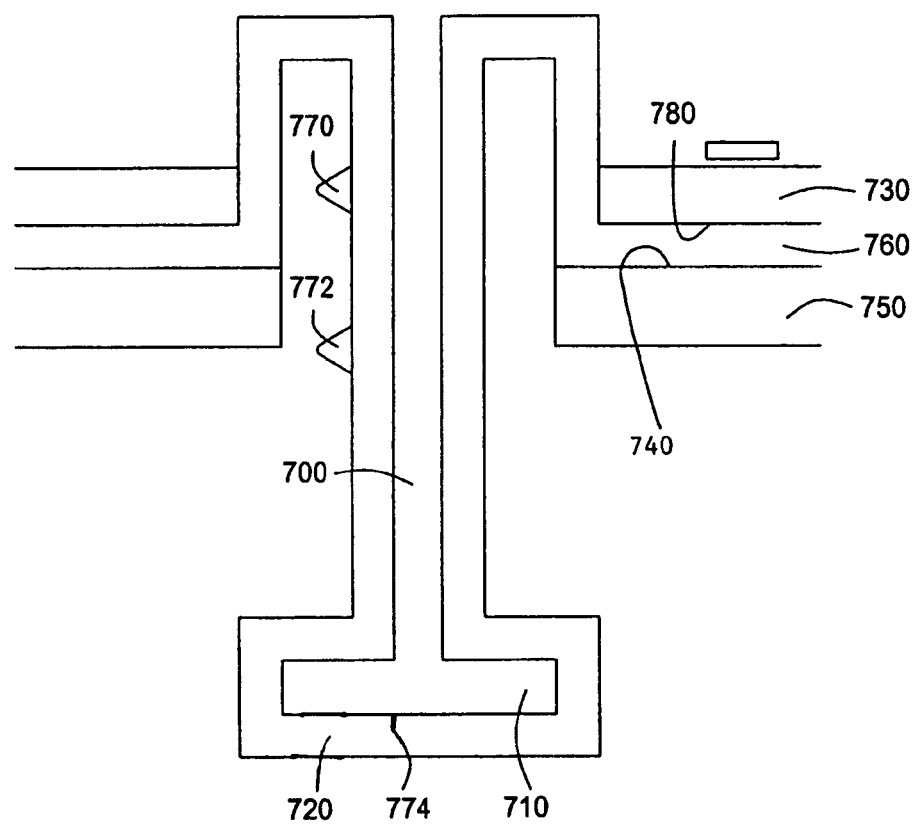

Referring to FIG. 7, this shows a shaft 700 with a thrust plate 710 at one end, having a relatively large gap 720 with the surrounding sleeve. The shaft supports a disc 730 for rotation over a surface 740 of a stationary hub or sleeve 750. Using the invention, air in the small gap 760 would work with liquid in journal bearings 770, 772 and thrust bearing 774 to dampen out effects of tilting. The design would utilize a single head, leaving the lower surface 780 of the disc available for damping.

Other features and advantages of this invention will be apparent to a person of skill in the art who studies this invention disclosure. Therefore, the scope of the invention is to be limited only by the following claims.

What is claimed is:

1. An apparatus comprising:
   a stationary member comprising a first surface and a second surface, wherein said first surface is relatively larger than said second surface; and
   a rotatable member comprising a third surface and a fourth surface, wherein:
      said first surface, said second surface, said third surface, or said fourth surface is ungrooved,
      said first surface of said stationary member and said third surface of said rotatable member form a first fluid dynamic bearing,
      said second surface of said stationary member and said fourth surface of said rotatable member form a second fluid dynamic bearing, and
      said first and second fluid dynamic bearings are operable to create a relative axial movement between said stationary member and said rotatable member for damping a relative tilting disturbance between said stationary member and said rotatable member, wherein said damping dissipates energy from said relative tilting disturbance through said relative axial movement at a frequency different than that of said relative tilting disturbance.

2. The apparatus of claim 1, wherein a first surface area of said first surface is different from a second surface area of said second surface, and wherein a third surface area of said third surface is different from a fourth surface area of said fourth surface.

3. The apparatus of claim 1, wherein said first fluid dynamic bearing comprises a first gap, wherein said second fluid dynamic bearing comprises a second gap, and wherein said relative tilting disturbance imparts a relative gap change larger in one of said first gap and said second gap over the other one of said first gap and said second gap.

4. The apparatus of claim 1, wherein said stationary member further comprises a fifth surface, wherein said rotatable member further comprises a sixth surface, wherein said fifth surface of said stationary member and said sixth surface of said rotatable member form a journal bearing, and wherein said journal bearing is disposed between said first fluid dynamic bearing and said second fluid dynamic bearing.

5. The apparatus of claim 1, wherein said relative axial movement comprises a relative movement of said stationary member in a first axis with respect to said rotatable member.

6. The apparatus of claim 1, wherein said frequency different than that of said relative tilting disturbance is greater than that of said relative tilting disturbance.

7. The apparatus of claim 6, wherein said frequency different than that of said tilting disturbance is double that of said relative tilting disturbance.

8. An apparatus comprising:
a stationary member comprising a first surface and a second surface, wherein said first surface is relatively larger than said second surface;
a rotatable member comprising a third surface and a fourth surface, wherein:
said first surface, said second surface, said third surface, or said fourth surface is ungrooved,
said first surface of said stationary member and said third surface of said rotatable member form a first fluid dynamic bearing,
said second surface of said stationary member and said fourth surface of said rotatable member form a second fluid dynamic bearing, and
said first and second fluid dynamic bearings are operable to create a relative axial movement between said stationary member and said rotatable member for damping a relative tilting disturbance between said stationary member and said rotatable member, wherein said damping dissipates energy from said relative tilting disturbance through said relative axial movement at a frequency different than that of said relative tilting disturbance; and
a first fluid disposed between said first surface of said stationary member and said third surface of said rotatable member, wherein said first fluid is selected from a group consisting of a liquid and a gas.

9. The apparatus of claim 8, wherein a first surface area of said first surface is different from a second surface area of said second surface, and wherein a third surface area of said third surface is different from a fourth surface area of said fourth surface.

10. The apparatus of claim 8, wherein said first fluid dynamic bearing comprises a first gap, an inverse square of which is proportional to a first local pressure in said first fluid dynamic bearing, wherein said second fluid dynamic bearing comprises a second gap, an inverse square of which is proportional to a second local pressure in said second fluid dynamic bearing, and wherein said first and second local pressures are different.

11. The apparatus of claim 8, wherein said stationary member further comprises a fifth surface, wherein said rotatable member further comprises a sixth surface, wherein said fifth surface of said stationary member and said sixth surface of said rotatable member form a journal bearing, and wherein said journal bearing is disposed between said first fluid dynamic bearing and said second fluid dynamic bearing.

12. The apparatus of claim 8, wherein said relative axial movement comprises a relative movement of said stationary member in a first axis with respect to said rotatable member.

13. The apparatus of claim 8, wherein said fourth surface is spherical or elliptical.

14. The apparatus of claim 8, wherein said frequency different than that of said relative tilting disturbance is greater than that of said relative tilting disturbance.

15. The apparatus of claim 14, wherein said frequency different than that of said relative tilting disturbance is double that of said relative tilting disturbance.

16. An apparatus comprising:
a stationary member comprising a first surface and a second surface, wherein said first surface is relatively larger than said second surface; and
a rotatable member comprising a third surface and a fourth surface, wherein:
said first surface, said second surface, said third surface, or said fourth surface is ungrooved,
said first surface of said stationary member and said third surface of said rotatable member form a first fluid dynamic bearing,
said second surface of said stationary member and said fourth surface of said rotatable member form a second fluid dynamic bearing,
said first fluid dynamic bearing has a first stiffness, said second fluid dynamic bearing has a second stiffness, and said first stiffness is different from said second stiffness, and
said first and second fluid dynamic bearings are operable to create a relative axial movement between said stationary member and said rotatable member for damping a relative tilting disturbance between said stationary member and said rotatable member, wherein said damping dissipates energy from said relative tilting disturbance through said relative axial movement at a frequency different than that of said relative tilting disturbance.

17. The apparatus of claim 16, wherein a first surface area of said first surface is different from a second surface area of said second surface, and wherein a third surface area of said third surface is different from a fourth surface area of said fourth surface.

18. The apparatus of claim 16, wherein said first fluid dynamic bearing comprises a first gap, an inverse square of which is proportional to a first local pressure in said first fluid dynamic bearing, wherein said second fluid dynamic bearing comprises a second gap, an inverse square of which is proportional to a second local pressure in said second fluid dynamic bearing, and wherein said first and second local pressures are different.

19. The apparatus of claim 16, wherein said stationary member further comprises a fifth surface, wherein said rotatable member further comprises a sixth surface, wherein said fifth surface of said stationary member and said sixth surface of said rotatable member form a journal bearing, and wherein said journal bearing is disposed between said first fluid dynamic bearing and said second fluid dynamic bearing.

20. The apparatus of claim 16, wherein said relative axial movement comprises a relative movement of said stationary member in a first axis with respect to said rotatable member.

21. The apparatus of claim 16, wherein
two or more of said first surface, said second surface, said third surface, or said fourth surface are ungrooved, three or more of said first surface, said second surface, said third surface, or said fourth surface are ungrooved, or all of said first surface, said second surface, said third surface, and said fourth surface are ungrooved.

22. The apparatus of claim 16, wherein said frequency different than that of said relative tilting disturbance is greater than that of said relative tilting disturbance.

23. The apparatus of claim 22, wherein said frequency different than that of said relative tilting disturbance is double that of said relative tilting disturbance.

* * * * *